United States Patent
Chen

(10) Patent No.: US 7,048,378 B2
(45) Date of Patent: May 23, 2006

(54) METHOD OF FABRICATING HOLOGRAPHIC CONTACT LENS

(75) Inventor: Cheng-Hsiu Chen, Qionglin Shiang (TW)

(73) Assignee: Innova Vision Inc., Qionglin Shiang (TW)

(*) Notice: Subject to any disclaimer, the term of this patent is extended or adjusted under 35 U.S.C. 154(b) by 32 days.

(21) Appl. No.: 10/949,407

(22) Filed: Sep. 27, 2004

(65) Prior Publication Data
US 2006/0012752 A1 Jan. 19, 2006

(30) Foreign Application Priority Data
Jul. 19, 2004 (TW) .............................. 93121489 A

(51) Int. Cl.
G02C 7/02 (2006.01)
(52) U.S. Cl. ................ 351/177; 351/160 R; 264/1.32; 264/2.5
(58) Field of Classification Search ................ 351/177; 264/1.32, 2.5
See application file for complete search history.

(56) References Cited

U.S. PATENT DOCUMENTS 6,139,147 A * 10/2000 Zhang ...................... 351/161
6,851,803 B1 * 2/2005 Wooley et al. ............ 351/159
2004/0207105 A1 * 10/2004 Altmann ................... 264/1.36

* cited by examiner

Primary Examiner—Jordan M. Schwartz
(74) Attorney, Agent, or Firm—Birch, Stewart, Kolasch & Birch, LLP

(57) ABSTRACT

A method of fabricating holographic colored contact lens is provided. A lens-making mold having multiple micro-lines on the peripheral surface is used to fabricate the contact lens and at the same time the micro-line pattern is copied onto the contact lens to form a light interference zone, which causes light waves to break up to produce light diffraction around the eyes, such that a holographic impression of a person's eyes can be created through the lenses. The perceived eyes through the lenses change color when looking from a different angle. This contact lens makes use of grating diffraction principles to impart colors on the eyes of a person wearing the contact lenses, without using any chemical colorants in the lens-making process; therefore wearing such contact lens is much healthier as opposed to a conventional colored contact lens.

19 Claims, 7 Drawing Sheets

METHOD OF FABRICATING HOLOGRAPHIC CONTACT LENS

This Non-provisional application claims priority under 35 U.S.C. § 119(a) on Patent Application No(s). 093121489 filed in Taiwan, Republic of China on Jul. 19, 2004, the entire

BACKGROUND OF THE INVENTION

1. Field of the Invention

The present invention relates to a method of fabricating a holographic contact lens, and in particular to a contact lens capable of generating a holographic impression of a person's eyes through the lenses and changing colors when looking from a different angle, and a method of fabricating the same.

2. The Related Art

Contact lenses are now more than ophthalmic lenses normally used for correction of impaired vision, such as nearsighted, farsighted, bifocal, or multi-focal. New contact lenses are targeted at the younger generation who wears them to enhance aesthetic or ornamental effects, such as color lenses and magic lenses.

People initially wear the colored contact lenses only for parties, or as part of the costume for stage performances, but through the recent innovations in lens-making, many people now wear the colored contact lenses because they want to change the color of their eyes to make them look more attractive. These people wear them regularly and usually for the greater part of the day.

However, a recent study on the habits of wearing colored contact lenses as it relates to the visibility, viewing brightness and comfort of the persons wearing contact lenses has raised some health concerns, as they suggested that persons constantly wearing the contact lenses in situations of inadequate lighting or at night time might permanently impair their eyesight, in addition to other findings that also said persons wearing contact lenses to do physical exercises or drive a car are likely to inflict eye injuries.

Normally, the pupil of the human eyes will grow larger or become smaller in response to the intensity of light received. The diameter of the pupil can grow to almost 6 mm at night. Since the peripheral area of most colored contact lenses are opaque and dyed, and the diameter of the light transmission zone of these colored contact lenses is between 4 to 6 mm, the size of the pupil can only grow as large as the light transmission zone of the contact lens which are disposed in front of a person's eyes. A German report also confirmed that long-time wearing of the colored contact lenses at nighttime or in inadequate lighting often results in permanent impairment to the eyesight and visibility.

The majority of lens makers of colored contact lenses have used some kinds of chemical colorants, which will hurt the eyes, in making the contact lenses. Some unscrupulous lens makers even use non-approved colorants or those never been field tested to reduce their product costs or to increase the range of colors of the contact lenses. Permanent impairment could be inflicted even for one-time users of such disposable contact lenses.

Also, conventional color contact lenses, or so-called cosmetic contact lenses, have color patterns imprinted on the surface of the contact lenses using chemical colorants. In general, these cosmetic contact lenses can only provide a planar impression, unlike holographic contact lens that can produce a stereoscopic effect and changing colors of a person's eyes when looking through the lenses from different angles.

This holographic contact lens is the result of using a hologram technology, which has brought about new ideas to the making of contact lenses. The hologram technology has been used in many applications such as laser CD labels, turntables or decorative boards. The hologram technology is to use the recording of multiple light interference lines on a light exposure film to be transferred onto a lens-making mold for the fabrication of the holographic contact lenses. One of the more commonly used methods is to use a photo resist agent to record the light interference lines, and, after an exposure and development process, an undulating layer is created on the surface of a molding board. Another method is to employ a computer emulation program to reproduce the light interference pattern directly on the molding board. Once the molding board is prepared, the lens-making molds can be produced in large quantity using press forming or roll pressing.

This holographic contact lens makes use of the diffraction grating principles to impart colors on the eyes of a person wearing the contact lenses, without chemical colorant or dyes, and also to produce a stereoscopic effect and changing colors when looking through the lenses from different angles, therefore such contact lens is much healthier to use as it apparently does no harm to the person's eyes even after prolonged use.

SUMMARY OF THE INVENTION

The primary objective of the present invention is to provide a holographic contact lens and the method of fabricating the same without using any chemical colorants in the lens-making process, thus making the contact lens safer to wear for long hours.

The secondary objective of the invention is to produce a holographic contact lens that is able to produce a stereoscopic effect and changing colors on the eyes of a person wearing the contact lenses when looking from a different angle.

To attain these objectives, the method of fabricating the holographic contact lens, comprising the steps of: (a) preparing a lens-making mold having an interference pattern, over which multiple long and narrow micro-lines are formed and to be copied onto the contact lens so produced, so that a holographic impression of a person's eyes through the lenses can be created when light waves are cast on the light interference pattern; (b) depositing lens-making liquid resin and forming the resin layer with the shape of a contact lens; (c) casting an UV ray on the resin layer to cause the resin to solidify and eventually develop into the shape of a contact lens; (d) removing the lens-making mold after the resin has been completely solidified, so that a semi-finished lens with micro-lines is formed; and (e) coating a layer of thin film (optical coating) over the contact lens covering the micro-lines, so that a holographic impression of a person's eyes through the lenses can be created.

The light interference zone is an area on the periphery of the contact lens surrounding the light transmission zone, over which multiple micro-lines are formed, where the micro-lines are long and narrow slits each having a width between 0.2–2 μm.

The lens-making mold is made with compound materials containing poly vinyl chloride (PVC), polystyrene (PS), polycarbonate (PC), and polypropylene (PP), which the UV irradiation can penetrate through and will not trigger chemical reaction with the lens-making resin.

Since the contact lens is a clear translucent body, it is necessary to add an optical coating over the light interference zone of the lens to enhance the diffraction of light around the periphery of a person's eyes to create a stereoscopic impression.

The optical coating can be either a metal-plated coating or a sol-gel coating having high refractive index. The conventional sol-gel coating can be formed to meet different refractive indices and to acquire anti-reflective, UV-resistive, and IF-resistive characteristics, wherein the materials for making the sol-gel coating, in accordance with the present invention, contain titanium dioxide ($TiO_2$), titanium dioxide and ferrous oxide ($TiO_2$—$Fe_2O_3$), and silicon dioxide ($SiO_2$) nano-particles.

According to the present invention, the holographic contact lens makes use of an innovative optical structure, the diffraction grating, to produce stereoscopic impression of a person's eyes and changing colors through the lenses, so that the eyes of a person wearing the contact lenses change color when looking through the lenses from a different angle.

Since the above mentioned contact lens makes use of the above optical structure to impart colors on the eyes when looking through the lenses from a different angle, without using any chemical colorant or colored lens, while the contact lens itself is colorless or naturally tinted, so the contact lens does no harm to the person's eyes even after long-time wearing.

The present invention will become more obvious from the following description when taken in connection with the accompanying drawings, which show, for purposes of illustration only, a preferred embodiment in accordance with the present invention.

DETAILED DESCRIPTION OF THE PREFERRED EMBODIMENT

Figure 1:
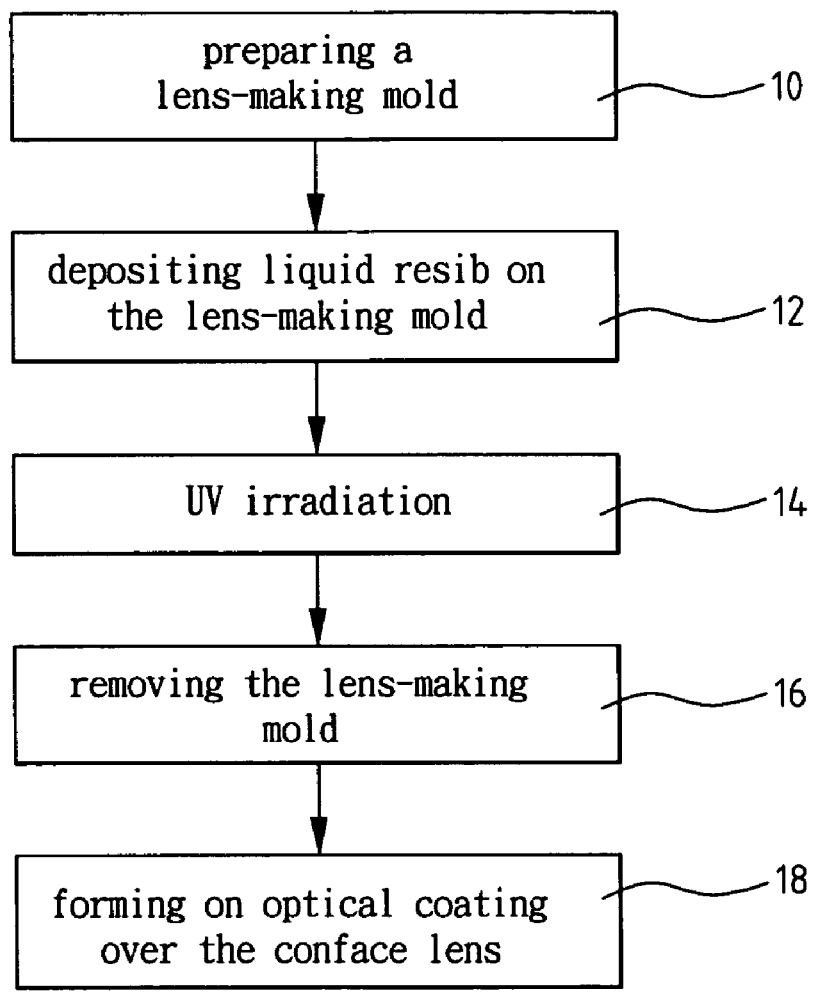
FIG. 1 is a flow chart of a lens-making process in accordance with the present invention.

Referring to FIG. 1, the flow chart depicts a standard lens-making process in accordance with the present invention, comprising the steps of:

(a) preparing a lens-making mold 10 with an interference pattern on the inner wall 32 of the lens-making mold 30, where the interference pattern 34 is composed of multiple micro-lines, each having a width between 0.2–2.0 μm, preferably 0.3–1.2 μm;

(b) depositing liquid resin 12 into the lens-making mold for the fabrication of contact lens, and using a cast molding or spin casting process to form the resin layer with a definite shape;

(c) casting an UV ray 14 on the lens-making resin 12 to make the resin layer 12 solidify and eventually develop into the shape of a contact lens;

(d) removing the lens-making mold 16 after the resin layer has been completely solidified, so that a semi-finished contact lens 36 is formed, where the micro-lines have been successfully copied onto corresponding portion of the contact lens; and (e) forming an optical coating 42 over the contact lens 36 including the light interference zone 40 over which multiple micro-lines have been formed.

The lens-making resin needs to be photopolymerisable resin that can be solidified under the UV irradiation, where commonly used materials for making the photopolymerisable resin contain p-MMA, p-HEMA and silicone-methacrylate.

The lens-making mold can be made by a metal molding board, which also has micro-line pattern on the corresponding portion to be copied onto the mold in the mold-making process. The micro-lines can be formed by precision laser engraving tools. The materials of the lens-making mold that are not to cause chemical reaction with the lens-making resin, preferably translucent, contain poly vinyl chloride (PVC), polystyrene (PS), polycarbonate (PC), and polypropylene (PP), but other compounds exhibiting similar characteristics can also be used.

Since the contact lens 42 is a translucent body, it is preferable to have an optical coating 18 on the surface layer of the contact lens 36 to enhance the diffraction of light passing through the micro-lines 40 of the contact lens 36, so as to produce a holographic impression of a person's eyes through the lenses. The optical coating 42 can be metal-plated coating or a translucent coating with high refractive index or high reflectivity. The metal-plated coating can be made with gold(Ag), silver(Au), aluminum(Al), and the translucent coating with high refractive index can be sol-gel coating using the sol-gel method. The preferred thickness for the optical coating is between 20–100 nm.

Sol-gel coating is a technology for forming a thin film from a liquid raw material using a chemical reaction. Conventionally, sol and coating solution parameters are carefully controlled to obtain a dense coating layer with complex shaped surface. Under processing conditions of low sol concentration, high spinning speed, and slow heating/cooling, a homogeneous layer can be formed. The sol-gel nano-particles normally having a diameter less than 20 nano are prepared in a translucent solution. Since these nano-particles have the characteristics of a small diameter and a high surface area, the so-gel coating has been widely used by the photoelectronics, photonics, electronics, and chemical industries to develop new products.

Also, the conventional sol-gel coating can be made to meet different refractive indices and to acquire anti-reflective, UV-resistive, or IF-resistive characteristics. The nano-particles suitable for making the sol-gel coating in accordance with the present invention includes titanium dioxide ($TiO_2$) nano-particles, titanium dioxide and ferrous oxide ($TiO_2$—$Fe_2O_3$) nano-particles, and silicon dioxide ($SiO_2$).

The holographic contact lens in accordance with the present invention possesses the UV-resistive characteristics.

Figure 2:
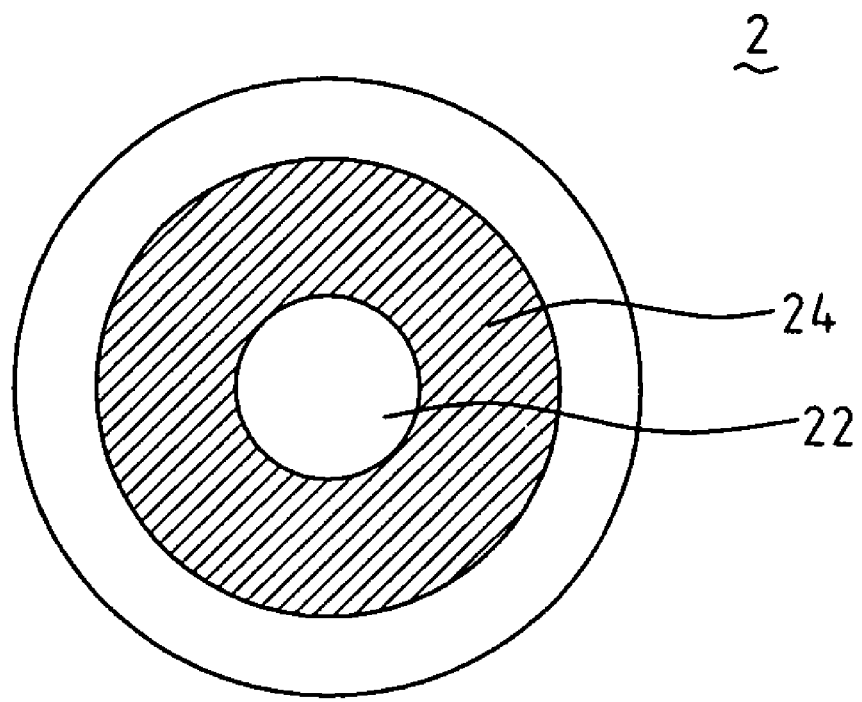
FIG. 2 is a top view of the structure of a holographic contact lens in accordance with the present invention.

Referring to FIG. 2, the top down view diagram represents the structure of the holographic contact lens 2, comprising a light transmission zone 22 in the center of the contact lens 2, which is similar to the type of lens used in conventional contact lens, with or without dioptry characteristics, and a light interference zone 24 on the periphery of the contact lens 2 surrounding the light transmission zone 22.

The position of light transmission zone 22 corresponds to the pupil of the person wearing the contact lenses, unlike the iris and other peripheral parts, the transmission zone receives light through the pupil of a person's eyes which then focus the light onto the retina. It is natural for the pupil to change in diameter in response to the intensity of incoming light and to control the amount of light entering the pupil. In the normal conditions, the diameter of the pupil is less than 4 mm, and the light transmission zone 22 of the contact lens is between 4.5–8 mm, preferably 5–7 mm, and the light interference zone 24 copied from the lens-making mold is to cover the peripheral area of the contact lens other than the light transmission zone 22.

The light interference zone 24 has multiple micro-lines on the surface which can take on any shape as long as the line pattern and the shape of the light interference pattern can produce a holographic impression of a person's eyes through the lenses. Some of the definitive shapes of the micro-line pattern include a lattice, a 2-dimensional structure, and a 3-dimensional structure, or it can be a complex shaped structure.

The process of fabricating a holographic contact lens is to be illustrated through several embodiments of the invention, but these examples are not meant to set the limits for the present invention.

Figure 3:
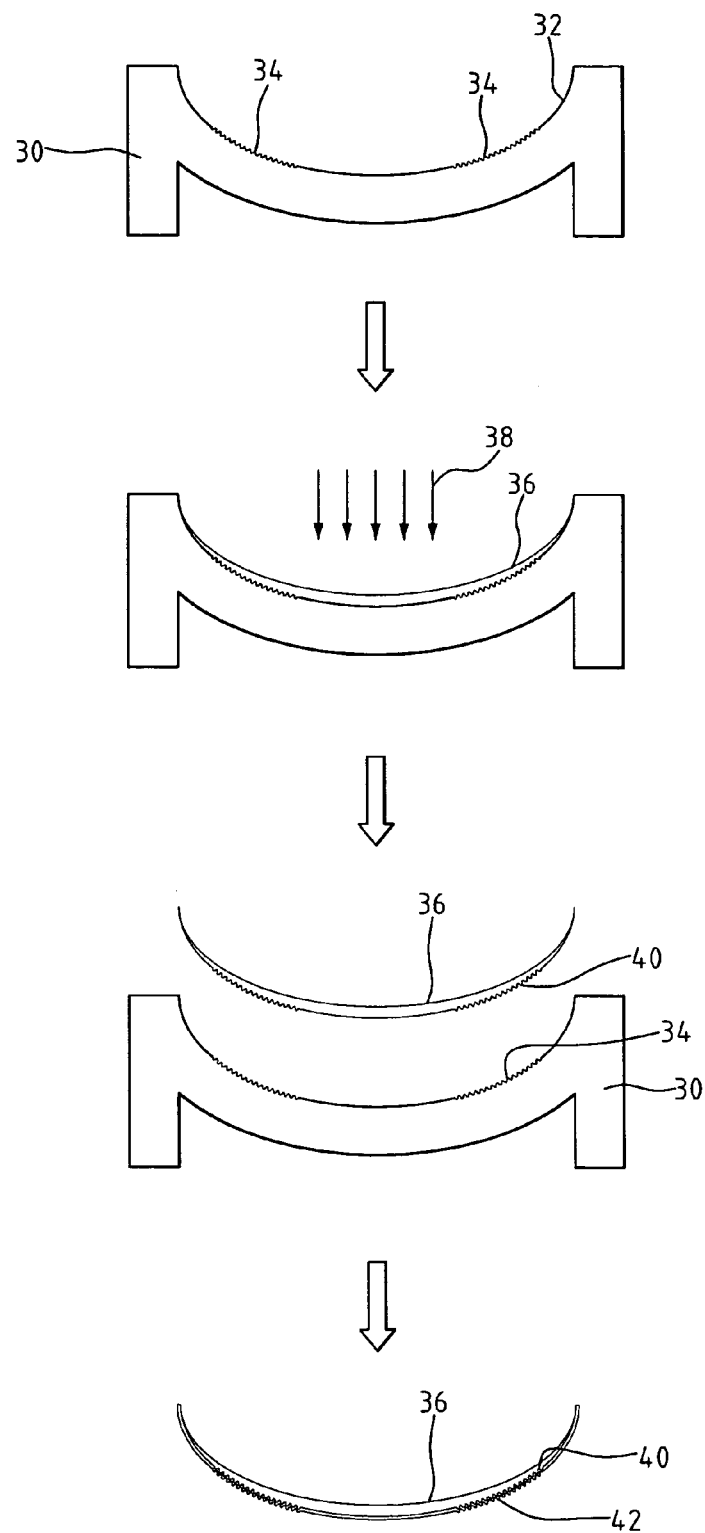
FIG. 3 is a first embodiment of the invention showing the lens-making process of a holographic contact lens using the conventional spin casting method.

Case 1: Referring to FIG. 3, the fabrication of the holographic contact lens, as the first embodiment of the invention demonstrates, is accomplished by a conventional spin casting technique. The sequence of fabrication steps includes:

(a) preparing a lens-making mold 30 having multiple micro-lines 34 imprinted on the inward curving portion of the inner wall 32 of the mold 30; and then (b) spreading liquid resin along the inner wall 32 of the lens-making mold 30, where spin casting technique is employed to spread the liquid resin evenly over the lens-making mold 30 and to shape the resin layer;

(c) casting an UV ray 38 on the resin layer to cause the resin to solidify under the UV irradiation and to develop into the shape of a contact lens 36;

(d) removing the lens-making mold 30 after the contact lens 36 has been completely solidified, where the micro-lines 34 on the lens-making mold 30 have been successfully copied onto the corresponding light interference zone 40 on the outward bending side of the contact lens 36; and (e) forming an optical coating 42 over the contact lens 36, including the light interference zone 40 over which multiple micro-lines have been formed.

Figure 4:
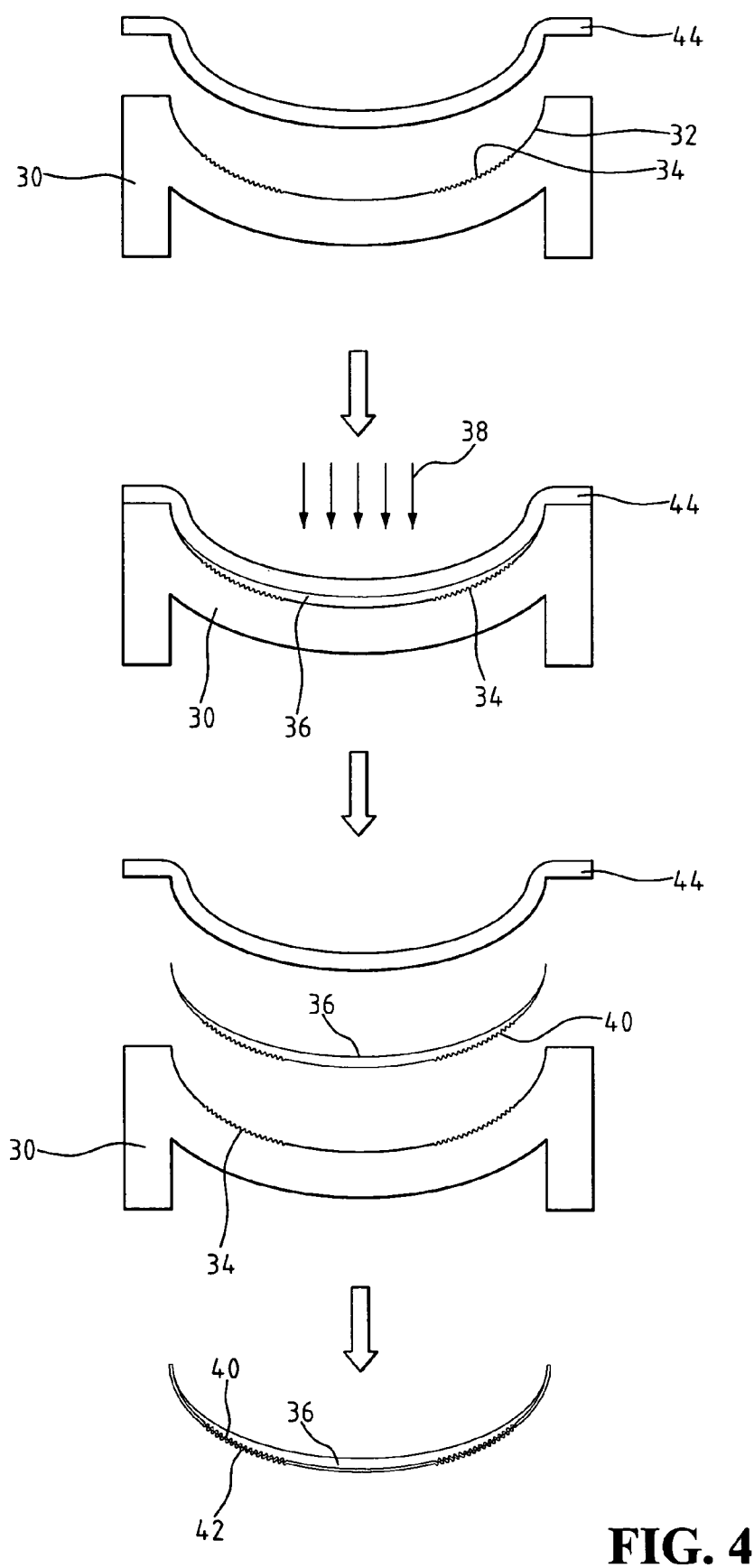
FIG. 4 is a second embodiment of the invention showing a lens-making process of a holographic contact lens using the conventional cast molding method.

Case 2: Referring to FIG. 4, the fabrication of the holographic contact lens, as the second preferred embodiment of the invention demonstrates, is accomplished by a cast molding technique. The sequence of fabrication steps includes:

(a) preparing a lens-making mold 30 having an upper half 44 and a lower half of the mold 30, where multiple micro-lines 34 are imprinted on the inner wall on the lower half of the mold 30;

(b) depositing liquid resin (not shown in diagram) along the inner wall 32 in the cavity between the lower and upper halves of the lens-making mold 30, where the conventional cast molding is used to shape the resin layer with the aid of the upper half 44 of the mold 30 by squeezing the liquid resin to make the resin spread out evenly over the lower half of the mold 30;

(c) casting an UV ray 38 to cause the resin layer to solidify under the UV irradiation and develop into the shape of a contact lens 36;

(d) removing the lens-making mold 30 to retrieve the contact lens 36 in between the upper and lower halves of the mold 30, where the micro-lines 34 on the lens-making mold 30 have been successfully copied onto the corresponding light interference zone 40 on the outward bending side of the contact lens 36; and (e) forming an optical coating 42 over the contact lens 36, including the light interference zone 40 over which multiple micro-lines have been formed.

Figure 5:
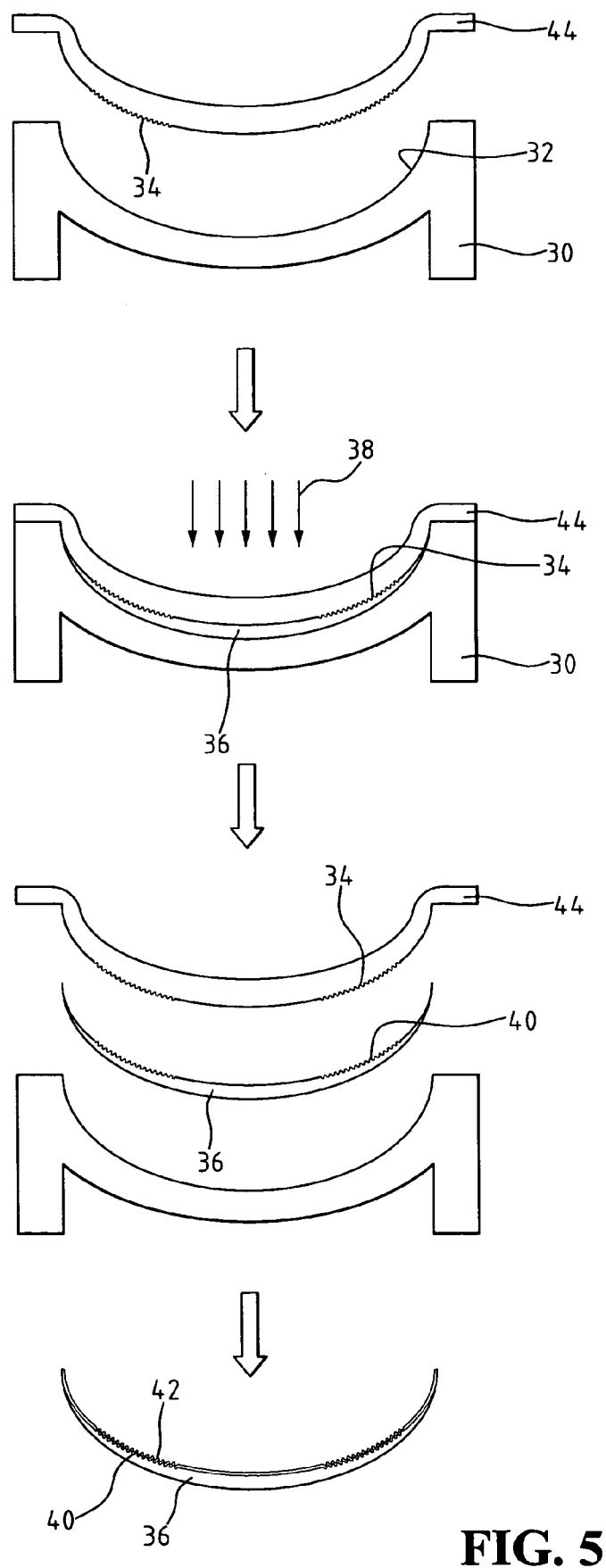
FIG. 5 is a third embodiment of the invention showing another lens-making process of holographic contact lens using the conventional cast molding method.

Case 3: Referring to FIG. 5, the fabrication of the holographic contact lens, as the third embodiment of the invention demonstrates, is accomplished by a conventional cast molding technique. The sequence of fabrication steps includes:

(a) preparing a lens-making mold 30 having an upper half 44 and a lower half of the mold 30, where multiple micro-lines 34 are imprinted on the inner wall of the upper half of the mold 30;

(b) depositing liquid resin along the inner wall 32 in the cavity between the lower and upper halves 44 of the lens-making mold 30, where the conventional cast molding technique is used with the aid of the upper half 44 to shape the resin layer by squeezing the liquid resin to make the resin spread out evenly over the lower half of the lens-making mold 30;

(c) casting an UV ray 38 on the resin layer to cause the resin to solidify under the UV irradiation and to develop into the shape of a contact lens 36;

(d) removing the lens-making mold 30 and retrieving the contact lens 36 between the upper and lower halves of the mold 30, where the micro-lines 34 have been successfully copied onto corresponding light interference zone 40 on the inward bending side of the contact lens 36; and (e) forming an optical coating 42 over the contact lens 36, including the light interference zone 40 over which multiple micro-lines have been formed.

Figure 6:
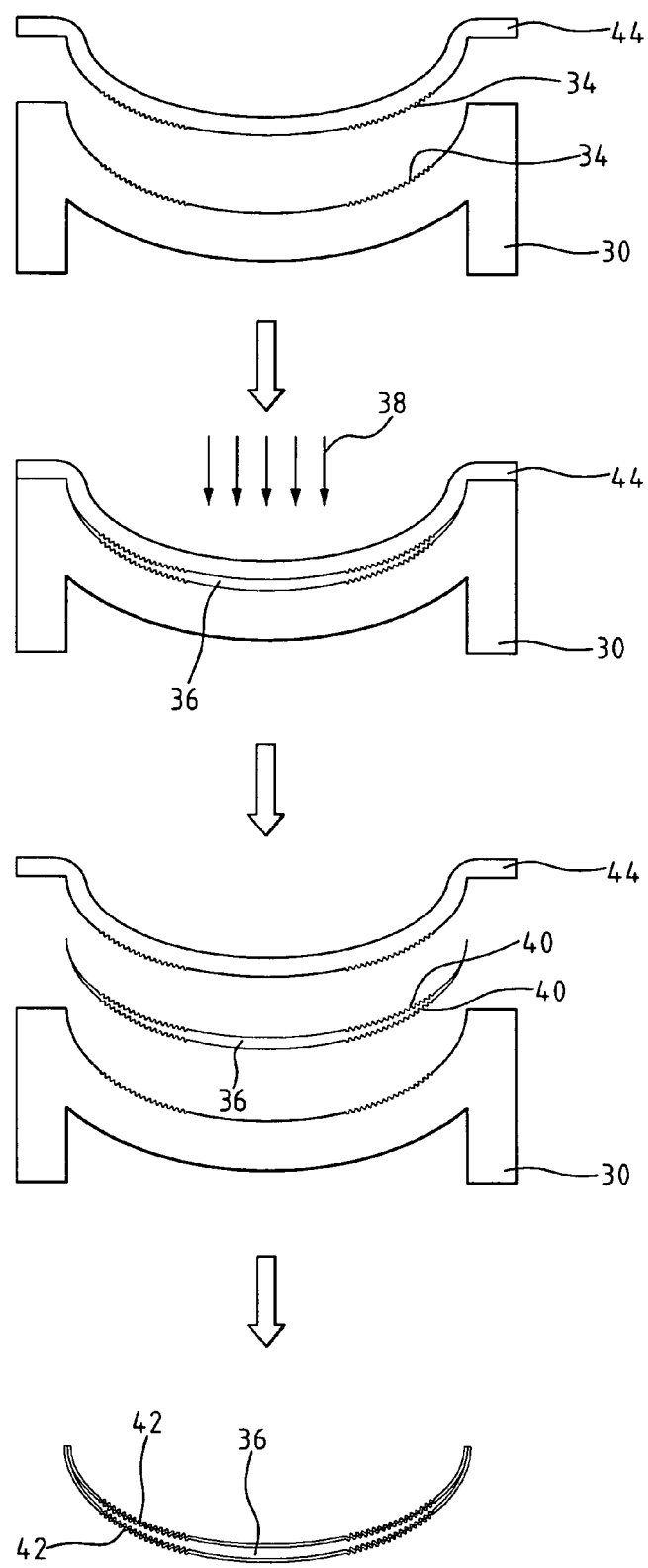
FIG. 6 is a fourth embodiment showing still another lens-making process of holographic contact lens using the conventional cast molding method.

Case 4: Referring to FIG. 6, the fabrication of the holographic contact lens, as the fourth embodiment of the invention demonstrates, is accomplished by a conventional cast molding technique. The sequence of fabrication steps includes:

(a) preparing a lens-making mold 30 having an upper half 44 and a lower half of the mold 30, where multiple micro-lines 34 are imprinted on the inner wall of the upper and lower half of the mold 30;

(b) depositing liquid resin (not shown) along the inner wall 32 in the cavity between the upper and lower halves of the lens-making mold 30, where the conventional cast molding technique is employed to shape the resin layer with the aid of the upper half 44 by squeezing the liquid resin to make the resin spread out evenly over the inner wall 32 of the lens-making mold 30;

(c) casting an UV ray 38 on the resin layer to cause the resin to solidify under the UV irradiation and to develop into the shape of a contact lens 36;

(d) removing the lens-making mold 30 and retrieving the contact lens 36 between the upper and lower halves of the mold 30, where the micro-lines 34 have been successfully copied onto corresponding light interference zones 40 respectively on two sides of the contact lens 36; and (e) forming an optical coating 42 on each side of the contact lens 36, including the two light interference zones 40 over which multiple micro-lines have been formed.

However, it is to be understood by persons skilled in the related art that the above-mentioned fabrication steps for the holographic contact lens can be modified and combined with the conventional lathe cutting technique.

Figure 7:
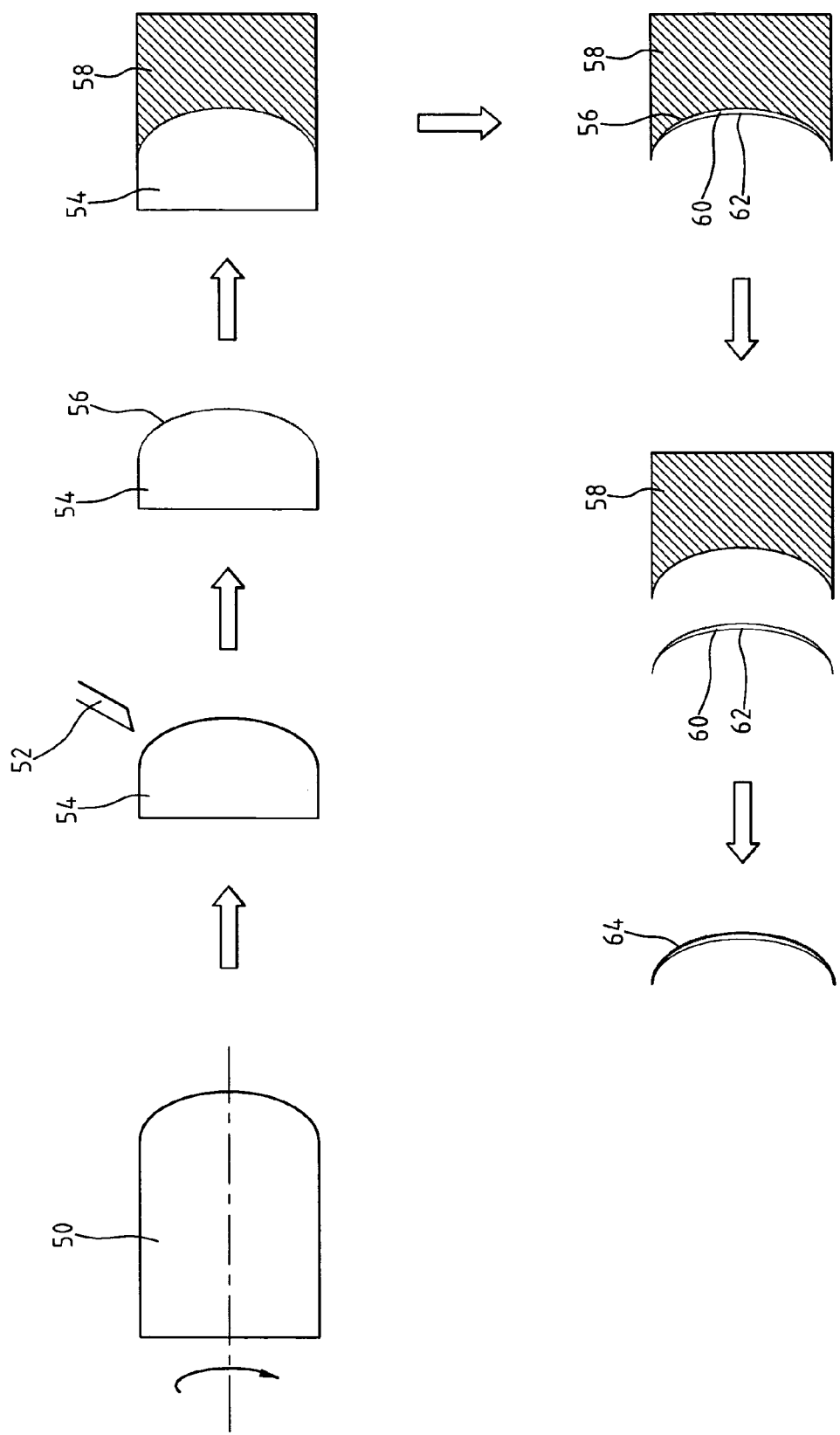
FIG. 7 is a fifth embodiment showing a lens-making process of holographic contact lens using the conventional lathe cutting method.

Case 5: Referring to FIG. 7, the fabrication of the holographic contact lens, as the fifth embodiment of the invention demonstrates, is accomplished with a conventional lathe cutting technique. The sequence of fabrication steps includes:

(a) pouring liquid resin 50 into a long glass tube;

(b) applying heat under the liquid resin 50 to cause the resin to solidify in the polymerization process;

(c) retrieving the solidified compound 50 from the glass tube which has the shape of the tube;

(d) cutting the compound 50 into multiple small chunks 54, each being shaped like a button;

(e) using the precision engraving machine 52 to create multiple micro-lines 56 on the outer periphery of the circular side of each chunk 54;

(f) applying lathe cutting to cut each chunk 54 into the shape of a contact lens 60 with an inward-bending curvature 62, where each chunk 54 is to be held by a fixture 58 in the process of cutting;

(g) removing the fixture 58 after finishing the contact lens 60; and (h) forming an optical coating 64 over the contact lens 60, including the light interference zone 56 over which multiple micro-lines have been formed.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A method of fabricating holographic contact lens, comprising the steps of:
   (a) preparing a lens-making mold having a holographic interference pattern, wherein the interference pattern is composed of multiple micro-lines which cause light waves to break up to produce light diffraction around the eyes of the person wearing the contact lenses;
   (b) depositing liquid resin along inner wall in a cavity of the lens-making mold, this is formed with the shape of a contact lens and to produce a stereoscopic effect of a person's eyes when perceived through the lenses;
   (c) casting an UV ray on the resin to cause the resin to solidify and to develop into the shape of a contact lens;
   (d) removing the lens-making mold when the resin layer has been completely solidified, where the micro-lines have been copied onto a corresponding light interference zone of the contact lens; and
   (e) forming an optical coating over the contact lens, including the light interference zone over which multiple micro-lines have been previously formed.

2. The method of fabricating holographic contact lens as claimed in claim 1, wherein the micro-lines are long and narrow slits each having a width between 0.2–2 μm.

3. The method of fabricating holographic contact lens as claimed in claim 1, wherein the lens-making mold is made with materials that enable an UV ray to penetrate but not to cause chemical reaction with the resin.

4. The method of fabricating holographic contact lens as claimed in claim 3, wherein the mold-making materials contain poly vinyl chloride (PVC), polystyrene (PS), polycarbonate (PC), and polypropylene (PP).

5. The method of fabricating holographic contact lens as claimed in claim 1, wherein the lens-making process in step (b) above involves a cast molding process to make the resin layer spread out evenly over the lens-making mold.

6. The method of fabricating holographic contact lens as claimed in claim 1, wherein the lens-making process in step (b) above involves a spin casting process to make the resin layer spread out evenly over the lens-making mold.

7. The method of fabricating holographic contact lens as claimed in claim 1, wherein the materials of the lens-making resin contain p-MMA, p-HEMA and silicone-methacrylate.

8. The method of fabricating holographic contact lens as claimed in claim 1, wherein the optical coating is a layer of metal-plated coating.

9. The method of fabricating holographic contact lens as claimed in claim 8, wherein the metal-plated coating contains gold (Ag), silver (Au), and aluminum (Al).

10. The method of fabricating holographic contact lens as claimed in claim 1, wherein the optical coating is a layer of translucent material having high refractive index.

11. The method of fabricating holographic contact lens as claimed in claim 10, wherein the optical coating is a sol-gel coating finished with the sol-gel method.

12. The method of fabricating holographic contact lens as claimed in claim 11, wherein the materials being used for producing the sol-gel coating contain titanium dioxide ($TiO_2$), titanium dioxide and ferrous oxide ($TiO_2$—$Fe_2O_3$), and silicon dioxide ($SiO_2$) nano-particles.

13. The method of fabricating holographic contact lens as claimed in claim 1, wherein the optical coating is a layer of translucent material having high reflectivity characteristics.

14. The method of fabricating holographic contact lens as claimed in claim 13, wherein the optical coating is a sol-gel coating finished with the sol-gel method.

15. The method of fabricating holographic contact lens as claimed in claim 14, wherein the materials used for producing the sol-gel coating contain titanium dioxide ($TiO_2$), titanium dioxide and ferrous oxide ($TiO_2$—$Fe_2O_3$), and silicon dioxide ($SiO_2$) nano-particles.

16. The method of fabricating holographic contact lens as claimed in claim 1, wherein the optical coating has a thickness between 20–100 μm.

17. The method of fabricating holographic contact lens as claimed in claim 1, wherein a light interference zone having multiple micro-lines is formed on the periphery of the contact lens surrounding the light transmission zone.

18. The method of fabricating holographic contact lens as claimed in claim 1, wherein a light transmission zone of the contact lens has a diameter between 4.5–8 mm.

19. A holographic contact lens that is fabricated through the lens-making process described in claim 1, having a structure comprising:
   a light transmission zone being formed in the center of the contact lens, which allows light to pass through to the pupil; and
   a light interference zone having multiple micro-lines being formed on the periphery of the contact lens surrounding the light transmission zone, which causes light waves to break up to produce light diffraction around the eyes of the person wearing the contact lenses, so that a stereoscopic effect of a person's eyes can be perceived through the lenses.

* * * * *